United States Patent [19]

Prewo et al.

[11]  4,341,826

[45]  Jul. 27, 1982

[54] INTERNAL COMBUSTION ENGINE AND COMPOSITE PARTS FORMED FROM SILICON CARBIDE FIBER-REINFORCED CERAMIC OR GLASS MATRICES

[75] Inventors: Karl M. Prewo, Vernon; John J. Brennan, Portland, both of Conn.

[73] Assignee: United Technologies Corporation, Hartford, Conn.

[21] Appl. No.: 149,603

[22] Filed: May 14, 1980

Related U.S. Application Data

[63] Continuation-in-part of Ser. No. 121,081, Feb. 13, 1980, and Ser. No. 147,672, May 7, 1980, Pat. No. 4,314,852.

[51] Int. Cl.³ .................. B32B 5/12; C04B 35/74; C04B 35/80; F02B 77/00
[52] U.S. Cl. .................. 428/35; 123/193 R; 156/89; 428/36; 428/110; 428/112; 428/113; 428/114; 428/294; 428/302; 428/303; 428/428; 428/446; 428/698; 428/701; 123/657
[58] Field of Search .................. 123/191 R, 193 R; 428/294, 35, 36, 428, 446, 698, 701, 302, 303, 110, 112, 113, 114; 156/89

[56] References Cited

U.S. PATENT DOCUMENTS 3,892,583  7/1975  Winter et al.

OTHER PUBLICATIONS

Kamo et al., "Ceramics for Adiabatic Diesel Engine", *Proceedings of the Workshop on High Temperature Materials for Advanced Military Engines*, vol. II, pp. 367–390, Institute of Defense Analysis, Wash., D.C., Paper No. P–1421, published Sep. 1979.

*Primary Examiner*—James C. Cannon
*Attorney, Agent, or Firm*—Harry J. Gwinnell

[57]  ABSTRACT

A high strength, fracture tough, high temperature oxidatively stable, heat insulating internal combustion engine combustion chamber component is described made of a silicon carbide fiber reinforced ceramic matrix or a silicon carbide fiber reinforced glass matrix material. An internal combustion engine containing combustion chamber components as above described is also disclosed.

20 Claims, 8 Drawing Figures

0°/90° Cross–plied

100μ

Unidirectional

50μ

0°/90° Cross — plied

100μ

INTERNAL COMBUSTION ENGINE AND COMPOSITE PARTS FORMED FROM SILICON CARBIDE FIBER-REINFORCED CERAMIC OR GLASS MATRICES

This application is a continuation-in-part of copending U.S. patent applications Ser. Nos. 121,081, filed Feb. 13, 1980 and 147,672, filed May 7, 1980, now U.S. Pat. No. 4,314,852.

DESCRIPTION

1. Technical Field

The field of art to which this invention pertains is internal combustion engines, and specifically combustion chamber components.

2. Background Art

In an attempt to make motorized vehicles more energy efficient, recent attention has turned to the use of nonmetal composite materials. For example, as described by V. A. Chase ("Automotive Applications of Composite Materials" published on pages 388–398 in the *Proceedings of the* 11th National SAMPE Technical Conference, Nov. 13–15, 1979, Boston, Mass.), General Motors has been using fiber reinforced plastics in their automobiles as body components since 1953, but few other applications have received attention until recently. Automotive areas where these fiber reinforced plastics have begun to receive attention are in such things as leaf-springs, coil-springs, stabilizer bars, and even such things as drive shafts. And while non-metallic composites have been considered for use in internal engine components, because of the high temperature instability of such components, their use has generally been limited to the lower temperature components of the internal engine environment. For example, Chase documents the fact that attempts at using a fiberglass-epoxy composite piston in an internal engine environment resulted in gradual degradation of the piston surface due to the thermal effects produced in the engine.

Similarly, Kamo et al ("Ceramics for Adiabatic Diesel Engine", *Proceedings of the Workshop on High-Temperature Materials for Advanced Military Engines*, Vol. II, pages 367–390, Institute of Defense Analysis, Washington, D.C., Paper No. P-1421, published September 1979) discloses that while ceramics have many desirable properties which would suggest their use as metal replacements in the internal combustion engine environment, such things as their low material strength and distortion under heating has made their use impractical. Accordingly, what is needed in the art are non-metallic internal combustion engine components with high strength, high fracture toughness, and oxidation stability at high temperatures.

DISCLOSURE OF INVENTION

The present invention is directed to a solution to the use of non-metallic composites in an internal combustion engine, which composites can withstand the high temperatures produced in such engine and still maintain their high strength and oxidative stability. The solution to this problem is the use of fracture tough silicon carbide fiber reinforced ceramic or silicon carbide fiber reinforced glass with high temperature strength, high temperature oxidation stability, and good heat insulating properties as internal combustion engine combustion chamber components.

One aspect of the invention includes the use of components comprising a multilayered-fiber reinforced ceramic made up of a plurality of ceramic layers, each layer reinforced with a plurality of unidirectional, continuous length silicon carbide fibers, each layer having an axial flexural strength greater than 70,000 psi and a high fracture toughness, exemplified by a critical stress intensity factor greater than $10 \times 10^3$ psi (inch)$^{\frac{1}{2}}$.

Another aspect of the invention includes the use of components comprising silicon carbide fiber reinforced borosilicate glass with flexural strengths above about 60,000 psi maintainable at temperatures up to about 600° C.

Another aspect of the invention includes the use of components comprising silicon carbide fiber reinforced high silica content glass with flexural strengths above about 60,000 psi maintainable at temperatures up to about 1150° C.

Another aspect of the invention includes the use of components comprising silicon carbide fiber reinforced aluminosilicate glass with flexural strengths above about 75,000 psi maintainable at temperatures up to about 700° C.

Another aspect of the invention includes an internal combustion engine containing combustion chamber components made of the above recited composite materials.

The foregoing, and other features and advantages of the present invention, will become more apparent in light of the following description and accompanying drawing.

BEST MODE FOR CARRYING OUT THE INVENTION

Figure 1:
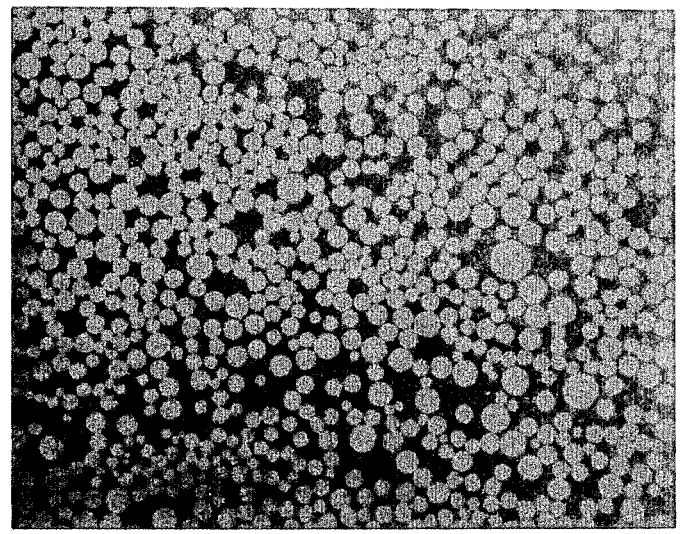
FIG. 1 shows in cross section an actual uniaxial silicon carbide fiber reinforced ceramic matrix composite component according to the present invention.

A glass, which can be converted to a ceramic, is the preferred matrix material to form the composite components of the present invention. During composite densification the matrix is retained in the glassy state, thus avoiding fiber damage and promoting densification under low applied pressure. After densification to the desired fiber plus matrix configuration, the glassy matrix can be converted to the crystalline state, the degree and extent of crystallization being controlled by the matrix composition and heat treatment schedule employed. A wide variety of glasses can be used in this manner, however, a strict limitation on the amount and activity of titanium present in the glass is of controlling importance. Accordingly, if titania nucleating agents are used, they must be inactivated or kept below one percent by weight. This can be accomplished by simply substituting another nucleating agent such as zirconia for the conventional titania or adding an agent, such as lead, to mask the reactivity of the titania toward the silicon carbide fiber. However, in any case it is necessary to either eliminate or mask the effects of the titania on the silicon carbide fiber to attain a composite with the improved properties disclosed. This problem is believed attributable to the reactivity of the titanium to the silicon carbide fiber. And while conventional lithium aluminosilicate is the preferred glass ceramic, other conventional glass ceramics such as aluminosilicate, magnesium aluminosilicate, and combinations of the above can be used as long as the ceramic matrix material is titanium free. By titanium free is meant that the composition contains less than about 1% by weight titanium or additional components (such as lead) which either mask or inactivate the reactivity of the titanium toward the SiC fibers. It has also been found that the reactivity of the titanium and its adverse composite effects can be lessened by a combination of decreased titania nucleating agent concentration and lower hot pressing temperatures—e.g., a glass ceramic composition with less that 2% by weight titania, hot pressed at temperatures below about 1100° C. And, as stated above, $ZrO_2$ is a preferred substitute for the titania nucleating agent in amounts up to about 5% by weight, producing no adverse effects on the composite properties. Other nucleating agents may also be successful substitutes for the titania. It should also be noted that in general the starting glass ceramic material can be obtained in the glassy state in powder form. If however, the ceramic material is obtained in crystalline form, it will be necessary to melt the material to form it into the glassy state, solidify it and subsequently crush it into powder form, preferably about −325 mesh. An important part of the invention is to select glass ceramic matrix material such as that described above which can be densified (in combination with the SiC fibers) in the glassy state with a viscosity low enough to permit complete densification with subsequent transformation into a substantially complete crystalline state providing a composite with a use temperature in excess of 1000° C. It is also possible to convert the starting crystalline powder to the glassy state during preheat treatment prior to application of pressure for densification.

While any silicon carbide fiber system with the requisite strength can be used with the ceramic matrix, a multifilament silicon carbide yarn with an average filament diameter up to 50 microns is preferred and yarn with average filament diameter of 5–15 microns especially preferred. Nippon Carbon Co. of Japan produces such a yarn with about 250 fibers per tow and an average fiber diameter of about 10 microns. The average strength of this fiber is approximately 2000 MPa (300,000 psi), and it has a use temperature of up to 1500° C. The yarn has a density of approximately 2.7 gm. per cc and an elastic modulus of approximately 221 GPa ($32 \times 10^6$ psi).

The method of forming both the ceramic and glass matrix composite components is also important for obtaining the improved properties described. The glass or ceramic constituents are generally obtained in powder form (preferably about −325 mesh) in the glassy state (noncrystalline form) and are combined in this powder state with the silicon carbide fibers by hot press consolidation. In the case of the ceramic, after densification the composite is held for a time and at a temperature sufficient to transform the noncrystalline ceramic into the crystalline state by controlled nucleation and growth of the appropriate crystalline phases. The ceramic or glass composite components are preferably formed by laying up layers containing continuous silicon carbide fibers and the powdered ceramic or the powdered glass. The articles formed are then hot pressed at elevated temperatures to form the composite components. The processing parameters and composition of the material can vary widely depending on component design considerations. The preferred method for forming the articles of the present invention is by hot pressing the mixture of silicon carbide fibers and noncrystalline ceramic powder or glass as mentioned above. This method gives particular design flexibility in orienting the fibers, and sheets formed by such method are particularly adapted to hot pressing into desired shapes. An exemplary method comprises continuously unwinding a tow of silicon carbide fibers (yarn) from a spool at a moderate rate of speed and passing such fibers through a slip of the powdered ceramic or powdered glass, solvent and plasticizer to impregnate the tow. The impregnated fibers are then rewound onto a larger rotating spool. An exemplary slip composition may be composed of 40 gm. of powdered glass or powdered ceramic and 780 ml of propanol. An alternative composition may comprise 85 gm. of the glass or ceramic and 200 gm. of propanol, 10 gm. of polyvinyl alcohol and 5 drops (approximately 1 cc.) of a wetting agent such as Tergitol ®. The receiving drum is preferably run at one revolution per minute or linear speed of 5 ft. per minute. Excess glass or ceramic and solvent can be removed by pressing a squeegee against the drum as it winds. Preferably the ground ceramic or glass is sized so that 90% of it passes through a −325 mesh sieve. The thus impregnated tape is then dried either at ambient temperature or with a radiant heat source to remove solvent.

Following impregnation, the fiber is removed from the drum and cut into strips to conform to the dimensions of the article to be fabricated. The fibers are then laid up in alternating ply stacks in any sequence desired, e.g., each layer unidirectional, alternating plies of 0° and 90°, or 0°/30°/60°/90°, 0°/±45°/90°, etc. In a key processing step the assembled composite is then hot pressed either under vacuum or under inert gas such as argon in metal dies coated with colloidal boron nitride or graphite dies sprayed with boron nitride powder at pressures of 6.9–13.8 MPa (1000–2000 psi) and temperatures of 1100°–1500° C. Time of hot pressing will vary depending on composite makeup but generally will be accomplished between about 10 minutes and 1 hour. Additional glass or ceramic also in powder form may be inserted between each layer as it is laid. SiC fiber loading in the composite is preferably at least about 50% by volume. The mold can also be vibrated to ensure uniform distribution of the ceramic powder or glass powder over the laid fiber surfaces. In the case of the ceramic, processing by starting with the matrix material in the glassy state to permit composite densification by hot pressing, followed by converting the ceramic into the crystalline state largely contributes to the superior properties of the resulting composite. If after hot pressing any significant portion of the ceramic matrix material is found to be in the glassy state, further heat treatment may be necessary to substantially completely crystallize the matrix for optimum high temperature performance. And although it is preferred to have the ceramic matrix material in the fully ceramic state, acceptable composite properties are attainable even if some of the ceramic matrix is retained in the composite in the glassy state, e.g. up to 25% by weight.

Based on the composition of the matrix material, the particular fiber reinforcement, and the process of forming the composite, an article with exceptional high strength, fracture toughness, and oxidation resistance especially at high temperatures is obtained. Each fiber reinforced layer of the ceramic composite component regardless of the number of layers or orientation has an axial flexural strength greater than 70,000 psi and in some instances greater than 100,000 psi. As for fracture toughness, each layer has a critical stress intensity factor greater than $10 \times 10^3$ (inch)$^{\frac{1}{2}}$. This is clearly superior to any known ceramic matrix composite currently available, especially with the low density and oxidation resistance at high temperatures exhibited by the composites of the present invention. An indication of this oxidation resistance can be seen from the data in Table I.

TABLE I

Bend Strength (3-pt) in Air vs. Temperature for SiC Yarn/Lithium Aluminosilicate Composites (50 Volume Percent SiC).

| | Bend Strength ($10^3$ psi) | |
|---|---|---|
| Temp. - °C. | Unidirectional Composite | 0°/90° Cross-plied Composite |
| 20 | 90 | 50 |
| 600 | 100 | 60 |
| 800 | 120 | 70 |
| 1000 | 140 | 70 |
| 1100 | 90 | 70 |
| 1200 | 40 | 40 |

From Table I, it can be seen that the ceramic composite components of the present invention exhibit excellent flexural strengths in an oxidizing environment well in excess of 1000° C. It is also felt that based on the type of matrix employed, these strengths can be maintained over 1300° C. It should be noted that while each individual layer will have an axial flexural strength greater than 70,000 psi the overall composite could have a flexural strength of a lesser value. A uniaxially fiber oriented composite would have an overall axial flexural strength greater than 70,000 psi, however, while each individual layer in a 0°/90° multiaxially oriented lay-up of individual fiber layers would have an axial flexural strength greater than 70,000 psi. The composite would have a flexural strength of greater than 35,000 psi because half the fibers would not be in the principal test direction. However, such composite would have better overall strength and impact resistance than, say a totally uniaxially oriented composite because of the multiaxial orientation of the fibers. Such multiaxially oriented fiber composites can be impacted with significant velocity without fracture, unlike conventional monolithic ceramic articles.

Figure 2:
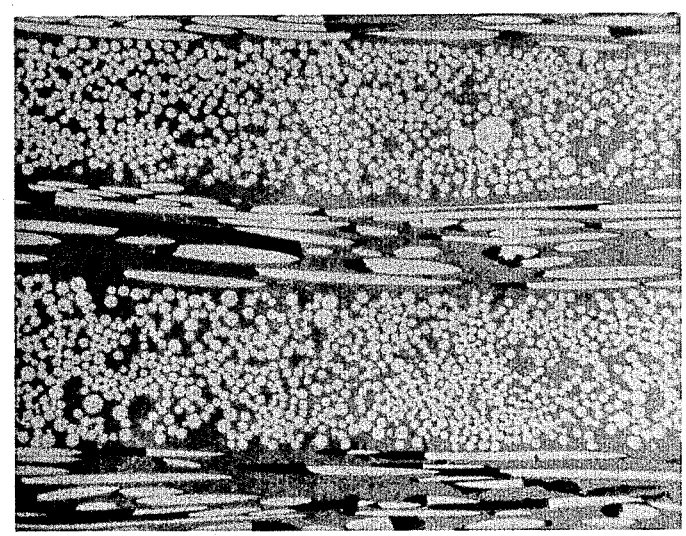
FIG. 2 shows in cross section an actual multiaxial silicon carbide fiber reinforced ceramic matrix composite component according to the present invention.

By unidirectional is meant all the SiC fibers are oriented in each individual layer in substantially the same axial direction (±5°). By uniaxial is meant that each layer in the composite is oriented such that all the unidirectionally laid fibers in all layers are oriented in substantially the same axial direction (±5°). Note FIG. 1 which demonstrates an actual sectional view of a composite containing a plurality of unidirectionally laid SiC fibers in a lithium aluminosilicate ceramic (LAS) matrix where the composite layers are uniaxially oriented; and FIG. 2 which demonstrates an actual sectional view of a SiC fiber—lithium aluminosilicate ceramic matrix containing a plurality of unidirectional fiber layers which are multiaxially oriented in the composite—in this case oriented in an alternating 0°/90° multiaxial orientation.

The fracture toughness of this composite system has also been measured using a notched beam test with unidirectionally reinforced samples exhibiting critical stress intensity factor ($K_{IC}$) values of $19 \times 10^3$ psi (inch)$^{\frac{1}{2}}$ at room temperature (RT); $24 \times 10^3$ psi (inch)$^{\frac{1}{2}}$ at 800° C.; $27 \times 10^3$ psi (inch)$^{\frac{1}{2}}$ at 1000° C.; and $18 \times 10^3$ psi (inch)$^{\frac{1}{2}}$ at 1100° C. These values are only slightly less than some aluminum alloys possess. Even the crossplied (0°/90°) LAS/SiC yarn composites exhibit $K_{IC}$ values of over $11 \times 10^3$ psi (inch)$^{\frac{1}{2}}$ from RT to 1100° C. Monolithic Corning 9608 lithium aluminosilicate, on the other hand, has very low fracture toughness with a $K_{IC}$ of approximately $1.3 \times 10^3$ psi (inch)$^{\frac{1}{2}}$ from RT to 1000° C.

It is particularly noteworthy that, even after initial fracture, composites of the present invention retain a substantial fraction of their original untested strength. This resistance to fracture, even in the presence of initiated damage, is distinctly different from the brittle nature of conventional ceramic materials.

If a glass matrix is employed, any borosilicate glass which will impart the described properties can be used with the present invention. Corning 7740 (Corning Glass Works) was found particularly suitable to produce the desired component properties. Similarly, Corning 7930 (about 96% by wt. silica), obtained by leaching the boron from a borosilicate glass, and Corning 1723 are the preferred high silica content glass and aluminosilicate glass, respectively. While the borosilicate glass and the aluminosilicate glass can be used in its as received −325 mesh size form, the desired properties for the high silica content glass composites can only be satisfactorily fabricated with the glass after it has been ball-milled in propanol for more than 100 hours. It should also be noted that mixtures of the above glasses may also be used, with properties tailored accordingly.

As with the ceramic matrix, any silicon carbide fiber system with the requisite strength can be used, although a multi-filament silicon carbide yarn with an average filament diameter up to 50 microns is preferred and yarn with average filament diameter of 5 to 15 microns is especially preferred. As stated above, Nippon Carbon Company of Japan produces such a yarn. If a silicon carbide monofilament is used, a typical silicon carbide monofilament of approximately 140 microns diameter is available from AVCO Systems Division, Lowell, Mass. This fiber exhibits an average tensile strength of up to 3450 MPa, has a temperature capability of over 1300° C. and is stable in oxidizing environments.

While a variety of methods can also be used to produce the glass composite components of the present invention, e.g. methods conventionally used to produce glassware articles, the preferred method is, as described above, by hot pressing a mixture of the silicon carbide fibers and powdered glass. As with the ceramic matrix, this method provides particular design flexibility in orienting the fibers, and composites formed by such method are particularly well adapted to hot pressing into desired shapes.

Figure 3A:
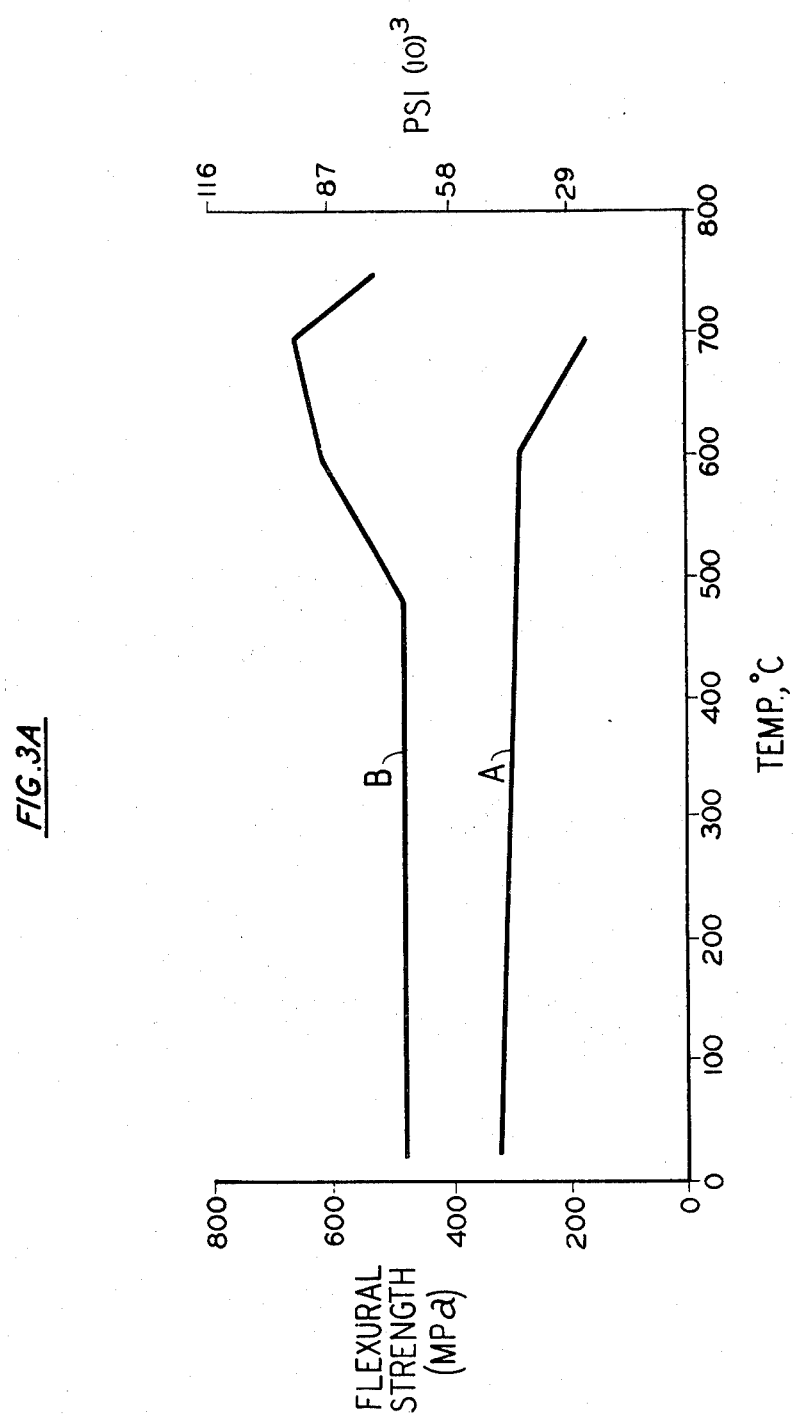
FIG. 3A shows graphically flexural strength data for a borosilicate glass composite component reinforced with silicon carbide yarn according to the present invention.
Figure 3B:
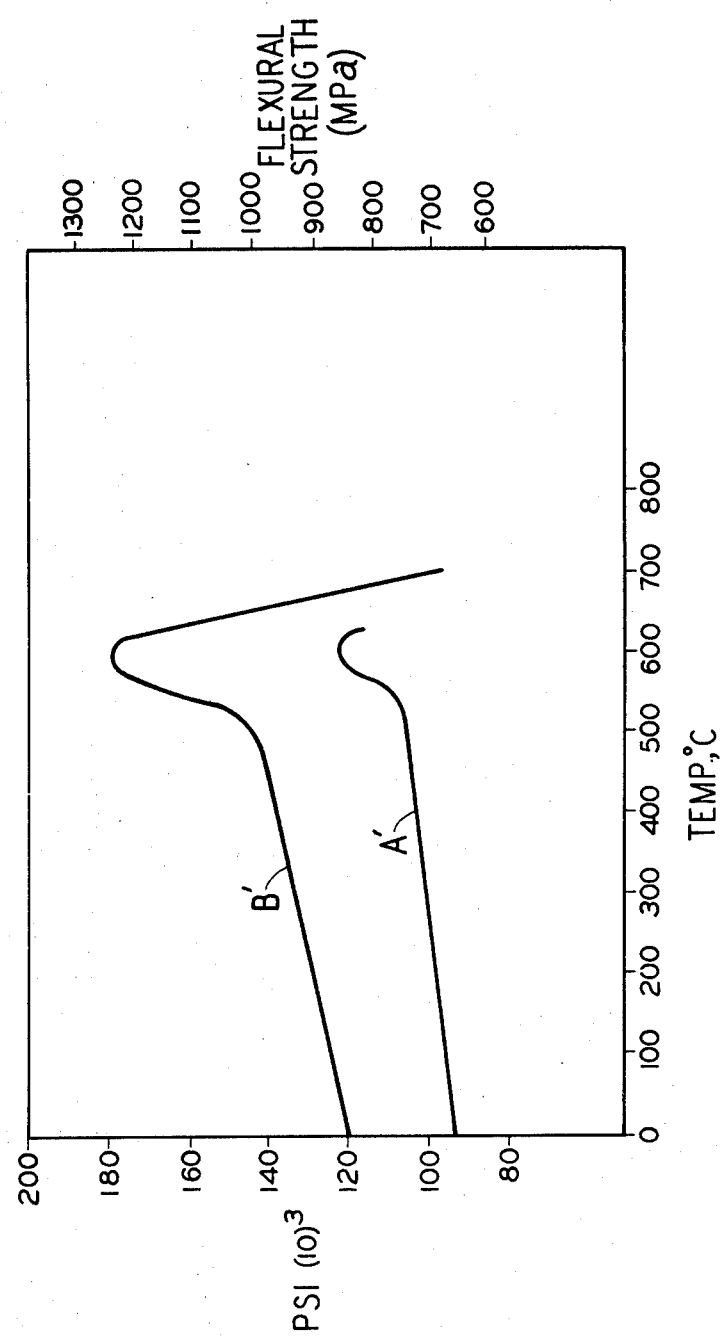
FIG. 3B shows graphically flexural strength data for a borosilicate glass composite component reinforced with large diameter silicon carbide monofilaments according to the present invention.

In addition to exhibiting excellent fracture toughness and high flexural strength, the glass composites of the present invention maintain these properties even up to exceptionally high temperatures which makes their use particularly suitable in the internal combustion engine. FIG. 3A demonstrates the exceptional flexural strength of a borosilicate glass-silicon carbide fiber reinforced composite component utilizing silicon carbide yarn. For a 0°/90° fiber orientation (curve A), flexural strengths of over 40,000 psi up to temperatures of about 600° C. were attained. For 0° fiber orientation (curve B) flexural strengths of over 60,000 psi up to temperatures of about 600° C. were attained. And as seen in FIG. 3B, the (0° oriented) silicon carbide fiber monofilament reinforced borosilicate glass (Corning 7740) composites also exhibit high flexural strengths above 60,000 psi and as specifically demonstrated by curves A and B above 75,000 psi for curve A (35% by volume fiber loading) and above 100,000 psi for curve B (65% by volume fiber loading) which flexural strengths are maintainable at temperatures up to about 600° C. The 0°/90° silicon carbide fiber orientation in the borosilicate glass matrix produces a flexural strength above about 40,000 psi and preferably above about 50,000 psi maintainable to temperatures up to about 600° C.

Figure 4:
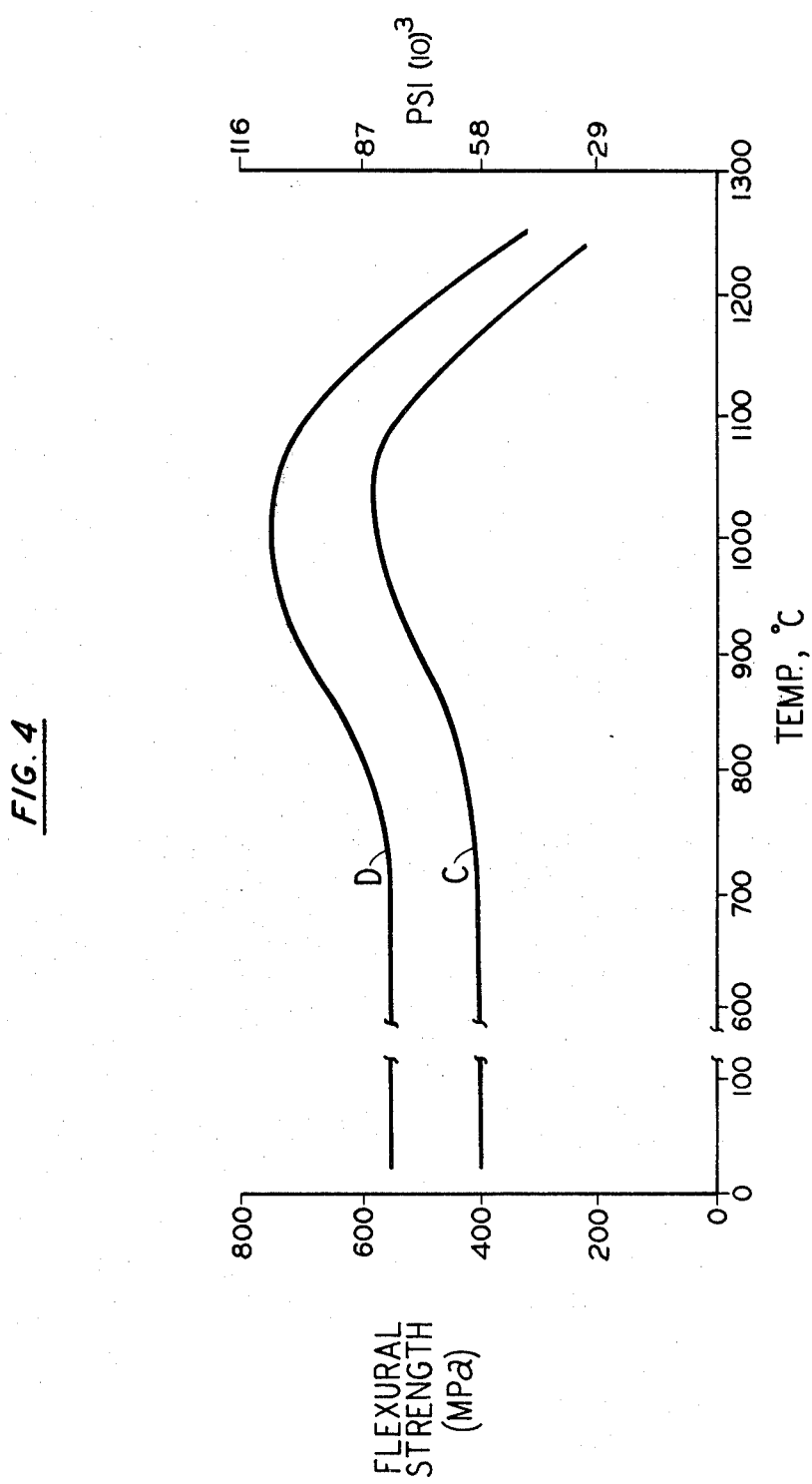
FIG. 4 shows graphically flexural strength data for a high silica content glass composite component according to the present invention.

FIG. 4 demonstrates an exemplary high silica content glass, silicon carbide fiber (0° oriented) reinforced composite. Curves C and D represent lower and upper bounds, respectively, for sample data obtained with composites containing between 30% and 40% fiber loading, by volume. These high silica content glass composites show flexural strengths in excess of 60,000 psi, and preferably in excess of 70,000 psi, even to temperatures up to about 1150° C.

Figure 5:
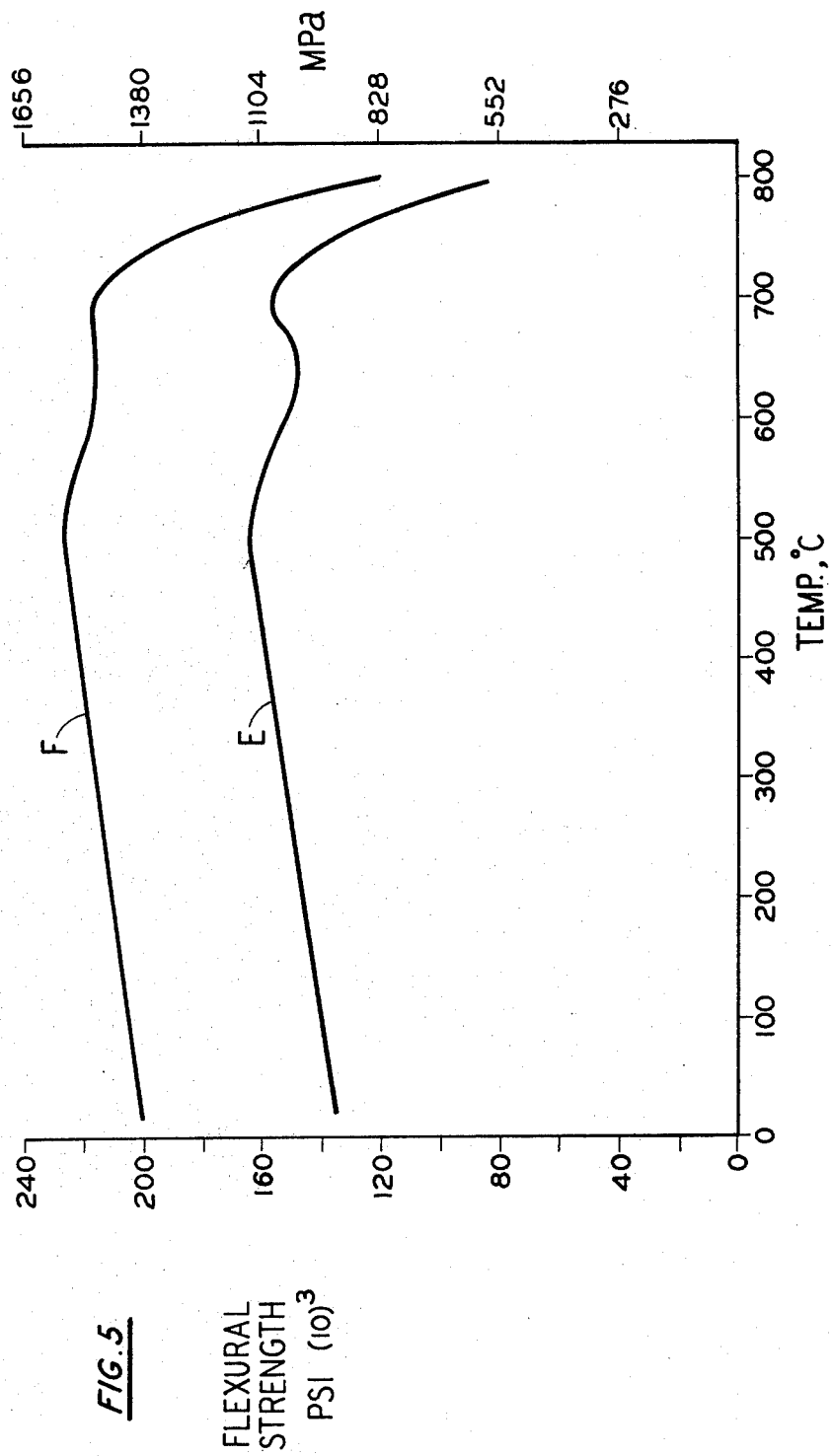
FIG. 5 shows flexural strength data for an aluminosilicate glass composite component according to the present invention.

FIG. 5 demonstrates the exceptional flexural strength of an aluminosilicate glass-silicon carbide fiber reinforced composite. FIG. 5 (fiber loading of 50% by volume) shows for a 0°/90° fiber orientation (curve E) flexural strengths of over 75,000 psi and preferably over 100,000 psi maintained to temperatures up to about 700° C.; and for a 0° fiber orientation (curve F) flexural strengths of over 150,000 psi and preferably over 200,000 psi are maintained to temperatures up to about 700° C. Fracture toughness, as measured by a three-point notched beam test, results in critical stress intensity factors ($K_{IC}$) above 15,000 psi (inch)$^{\frac{1}{2}}$ for the 0°/90° orientation and above 25,000 psi (inch)$^{\frac{1}{2}}$ for the 0° orientation that are maintained up to about 700° C.

While the components of the present invention can be used in any suitable area of the internal combustion engine, their primary utility is in those areas of the engine which see temperatures over about 500° C. up to about 1000° C., which consists primarily of the combustion chamber. Accordingly, by combustion chamber components is meant any component in the internal combustion engine which will be subjected to temperatures over approximately 500° C. The composite material strength, both hot and cold, and stability both in distortion and oxidation resistance, coupled with high fracture toughness make the components of the present invention particularly useful in this environment. For example, graphite epoxy materials are generally not useful above 200° C. and graphite glass composites are usually impractical in environments which see temperatures above 350° C. As such, the components of the present invention are far superior to anything previously attempted in this environment.

The materials of the present invention also provide a wide variety of choice of matrix material based on the particular engine temperature that the components will encounter. For example, if only temperatures up to about 600° C. will be seen by the components, the glass matrix, and particularly the borosilicate glass will be suitable. At use temperatures up to 700° C., the aluminosilicate glass can be used. And at component temperatures of up to 1000° C. (and higher) and high silica content glass and the ceramic matrix materials can be used. Of course, matrices suitable for components which will see the higher temperatures would naturally also be suitable for use in the lower temperature environments.

Representative combustion chamber components according to the present invention which see such temperatures are the piston head hot plate, piston, piston cap, cylinder wall sleeve, exhaust ports, exhaust manifold, fluid injectors and valves. It should also be noted that the use of the components according to the present invention, which have excellent insulating properties, compared to, for example conventional metallic components, will increase the efficiency of the engines they are used in and also have the potential to reduce and even eliminate the need for conventional cooling.

Figure 6:
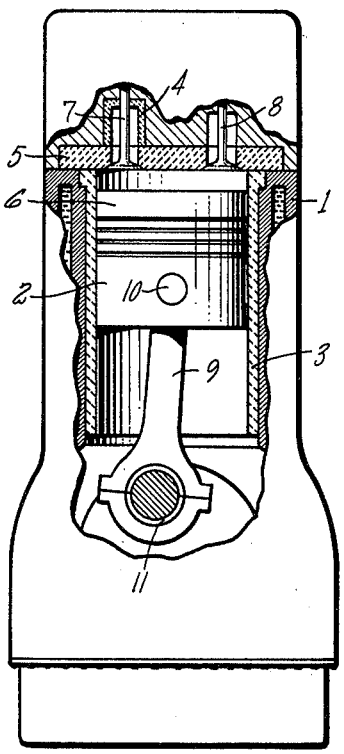
FIG. 6 shows in cross section an internal combustion engine combustion chamber with components according to the present invention.

Potential applications of component parts according to the present invention can be seen in FIG. 6 where 1 indicates the engine block, 2 a composite piston according to the present invention, 3 a composite cylinder liner according to the present invention 4, a composite exhaust port-liner according to the present invention, 5 a composite cylinder head hot plate according to the present invention, 6 a composite piston head according to the present invention, 7 and 8 composite valves according to the present invention, 9 a connecting rod, 10 wrist pin and 11 bearing.

Figure 7:
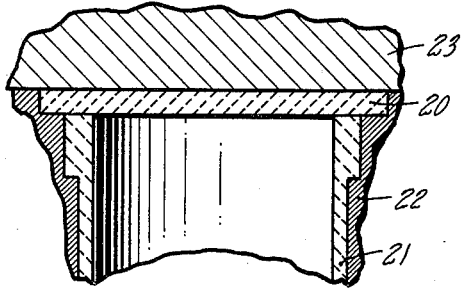
FIG. 7 shows a cylinder head hot plate component according to the present invention.

In FIG. 7, 20 is a composite cylinder head hot plate according to the present invention, 21 a composite cylinder liner according to the present invention, 22 the engine block, and 23 the cylinder head.

Although the invention has been shown and described with respect to detailed embodiments thereof, it should be understood by those skilled in the art that various changes and omissions in form and detail may be made therein without departing from the spirit and the scope of the invention.

We claim:

1. An internal combustion engine combustion chamber component comprising a plurality of substantially titanium-free ceramic layers selected from the group consisting of (a) aluminosilicate, (b) lithium aluminosilicate, (c) magnesium aluminosilicate, and (d) mixtures thereof, each layer reinforced with a plurality of unidirectional, continuous length silicon carbide fibers, each layer having an axial flexural strength greater than 70,000 psi, a high fracture toughness exemplified by a critical stress intensity factor greater than $10 \times 10^3$ psi (inch)$^{\frac{1}{2}}$, high temperature strength, high temperature oxidation stability, and good insulating properties.

2. An internal combustion engine combustion chamber component comprising a silicon carbide fiber reinforced glass composite consisting essentially of about 30% to about 70% by volume silicon carbide fibers in a glass matrix selected from the group consisting of borosilicate glass, high silica content glass, aluminosilicate glass and mixtures thereof, the composite having a fracture toughness exemplified by a critical stress intensity factor above about 15,000 psi (inch)$^{\frac{1}{2}}$, high temperature strength, high temperature oxidation stability and insulating properties.

3. The component of claims 1 or 2 wherein the silicon carbide fiber containing layers are uniaxially oriented.

4. The component of claims 1 or 2 wherein the silicon carbide fiber containing layers are multiaxially oriented.

5. The component of claims 1 or 2 wherein the silicon carbide fibers comprise a multifilament silicon carbide yarn with an average filament diameter of up to 50 microns.

6. The component of claim 5 wherein the yarn has an average filament diameter of 5-15 microns.

7. The component of claims 1 or 2 wherein the silicon carbide fibers are present in an amount of at least about 40% by volume.

8. The component of claim 4 wherein the fibers are oriented to 0°/90°, 0°/±45°/90°, or 0°/30°/60°/90° orientation.

9. The component of claim 1 wherein the composite is formed by starting with the ceramic in the glassy state and converting it from the glassy state to the ceramic state after densification of the composite.

10. The composite of claim 2 having a flexural strength above about 60,000 psi up to a temperature of about 600° C.

11. The composite of claim 2 wherein the fibers have a substantially 0°/90° orientation within the composite.

12. The composite of claim 11 wherein the silicon carbide fiber is present in an amount about 50% by volume.

13. The component of claim 2 having a flexural strength above about 150,000 psi at temperatures up to about 700° C.

14. The component of claim 2 having a fracture toughness above about 25,000 psi (inch)$^{\frac{1}{2}}$.

15. The component of claims 1 or 2 wherein the component is a cylinder head hot plate.

16. The component of claims 1 or 2 wherein the component is a piston, piston cap, cylinder wall sleeve, or valve.

17. An internal combustion engine containing at least one combustion chamber component comprising a plurality of substantially titanium-free ceramic layers selected from the group consisting of (a) aluminosilicate, (b) lithium aluminosilicate, (c) magnesium aluminosilicate, and (d) mixtures thereof, each layer reinforced with a plurality of unidirectional, continuous length silicon carbide fibers, each layer having an axial flexural strength greater than 70,000 psi, a high fracture toughness exemplified by a critical stress intensity factor greater than $10 \times 10^3$ psi (inch)$^{\frac{1}{2}}$, high temperature strength, high temperature oxidation stability, and good insulating properties.

18. An internal combustion engine containing at least one combustion chamber component comprising a silicon carbide fiber reinforced glass composite consisting essentially of about 30% to about 70% by volume silicon carbide fibers in a glass matrix selected from the group consisting of borosilicate glass, high silica content glass, aluminosilicate glass and mixtures thereof, the composite having a fracture toughness exemplified by a critical stress intensity factor above about 15,000 psi (inch)$^{\frac{1}{2}}$, high temperature strength, high temperature oxidation stability and insulating properties.

19. The engine of claims 17 or 18 wherein the component is a cylinder head hot plate.

20. The engine of claims 17 or 18 wherein the component is a piston, piston cap, cylinder wall sleeve, or valve.

* * * * *